Aug. 30, 1938.   K. C. ALLISON   2,128,279
SWITCH
Original Filed July 9, 1936

Inventor:
Kenneth C. Allison
By Robert L. Kahn
Atty.

Patented Aug. 30, 1938

2,128,279

UNITED STATES PATENT OFFICE 2,128,279

SWITCH

Kenneth C. Allison, Arlington Heights, Ill., assignor to Oak Manufacturing Company, Chicago, Ill., a corporation of Illinois Application July 9, 1936, Serial No. 89,794
Renewed October 28, 1936

3 Claims. (Cl. 200—11)

This invention relates to a switch construction and more particularly to the construction of a gang switch useful in radio receivers and other places where a large number of circuits must be simultaneously acted upon. It is an object of this invention to devise a simple and compact stator construction which will permit contacts insulated from each other to be supported on opposite sides of the stator by a single supporting means.

In the drawing, Figure 1 is a plan view of a single switch section comprising a stator and rotor.

Figure 1:
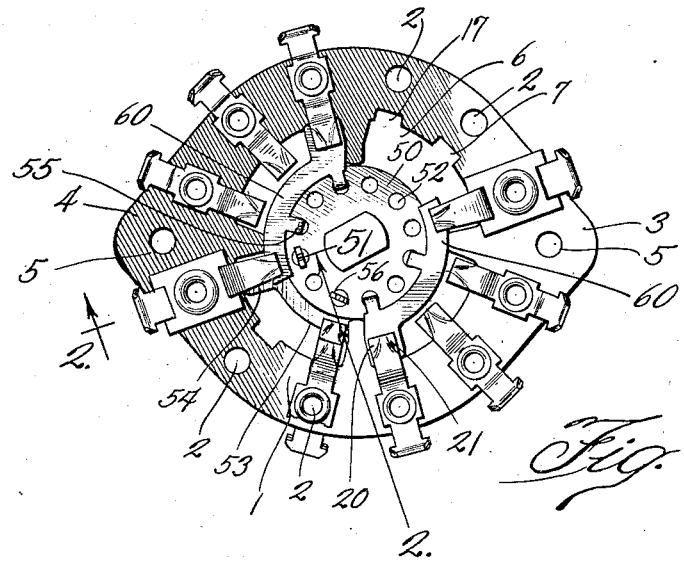

The switch section shown in Figure 1 comprises a flat plate 1 of rigid insulating material having a plurality of apertures 2 disposed on the circumference of a circle. Plate 1 is of a generally circular contour and has protruding portions 3 and 4 on opposite sides thereof. In each portion 3 and 4 a mounting aperture 5 is provided so that the entire switch section may be mounted on bolts as shown, for example, in Patent 2,012,492. The interior of the stator is cut to form a region 6. Along the inside edge of stator 1 indentations 7 are provided registering with each of the apertures for a purpose to be later explained.

Figure 2:
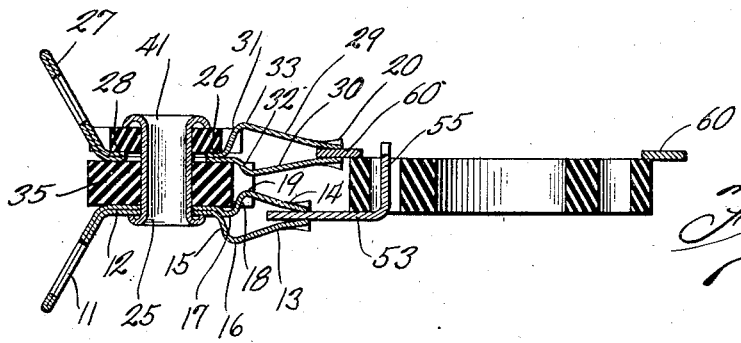
Figure 2 is a sectional view along the line 2—2 of Figure 1.
Figure 3:
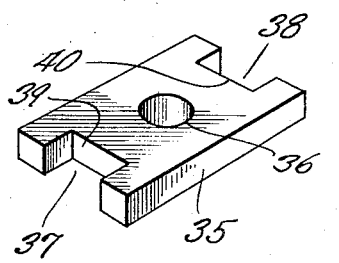
Figure 3 is a detail of an insulator.

In one or more of the apertures two stator contacts may be mounted as shown in Figure 2. Below plate 1 a contact 10 is provided comprising a bent over strip of spring metal forming a soldering portion 11 and a mounting portion 12 terminating in jaws 13 and 14. Jaw 13 extends upwardly at 15 and is bent over at 16 and extends downwardly toward the plane of mounting portion 12. Jaw 14 extends upwardly but a short distance at 17 from mounting portion 12 and then is bent downwardly at 18 and at 19 is bent upwardly again to form a cooperating jaw. Both jaws have their side edges 20 and 21 bent upwardly to provide open guiding surfaces.

A rivet 25 passes upwardly through stator 1 and retains contact 10 rigidly in position. The upwardly bent portion 19 of the upper jaw is adapted to fit in indentation 7 and retain the contact in position against rotary movement.

Rivet 25 supports above stator 1 an additional contact 26 of generally similar construction having a soldering portion 27 and a mounting portion 28. Two jaws 29 and 30 are bent at 31 and 32 oppositely to each other and gradually taper together. It will be noted that the lower jaw 30 is not bent down as far below the plane of the mounting portion, as jaw 31 is above this plane. This is so that the two inside jaws 14 and 30 will clear each other. It will be noted furthermore, that jaws 29 and 30 extend inwardly toward the center of the stator further than the lower contact jaws. It is obvious, however, that both opposing contacts may be of the same shape and extend the same distance inwardly if so desired.

To support upper contact 26 in spaced relationship to metallic rivet 25 a small insulating block 35 is provided. This block has an aperture 36 through which rivet 25 passes and snugly fits. Block 35 is long enough to extend from the outer to the inner edge of stator 1. This block is just a bit wider than the contacts and is provided on the opposite sides thereof with indentations 37 and 38. Contact 26 is rigidly maintained in position against rotary movement by soldering portion 27 extending upwardly into indentation 37 of the insulating block 35. Upwardly extending portion 31 of jaw 29 is disposed in indentation 38 while downwardly extending portion 32 of lower jaw 30 extends into indentation 2 of the stator. The contact is kept from movement along its length by the upwardly extending portions thereof engaging the bottoms 39 and 40 of indentations 37 and 38 respectively. The top of the rivet 41 is turned over tightly against insulating block 35 to maintain the oppositely disposed contacts rigidly in position.

Cooperating with the stator contacts is a flat insulating rotor 50 centrally disposed thereof. Rotor 50 is of insulating material and is provided near the periphery thereof with a series of apertures 52. A plurality of flat segmental contacts is shown at 53 and has a generally circular outer and inner edge. The outer edge is provided with a contact extension 54 which may be of any angular extent and may be provided in any number or even omitted. This extension 54 is adapted to engage short jaws 13 and 14 of contact 10. The inner edge of rotor contact 53 is provided with a plurality of fingers 55 and 56 which are bent through apertures 52 and function as a retaining means for the contact. The rotor 50 may carry on the opposite side thereof one or more similar contacts 60 similarly provided with fingers and mounted on rotor 50 by such fingers engaging apertures 52. It will be noted that the segmental contacts lie flat on opposite sides of rotor 50 and extend therebeyond to form active rotor contact surfaces.

Having described the invention, what is claimed is:

1. In an electric switch, a flat stator insulating member having an interior region cut out therefrom with slots on the inner edge of said stator and apertures through said stator adjacent said slots, a rotor having contacts mounted on opposite sides thereof disposed in said interior region, contacts mounted in pairs on said stator at certain apertures, one contact being on one side of said stator and another contact on the other side thereof, each contact having an outwardly extending connecting portion bent away from the stator plane, a body portion disposed on said stator at an aperture thereof and a contacting portion extending inwardly and having a part thereof bent in to the stator plane and fitting into the corresponding slot in the stator, an insulating block disposed above said one contact and having a slot in the outer edge into which the connecting portion of said one contact fits, said one contact having an aperture concentric with the stator aperture but larger, said other contact having an aperture similar to and registering with the stator aperture, and metallic means engaging said other contact and passing through the concentric apertures to maintain said contacts and insulator rigidly on said stator.

2. In an electric switch a flat stator insulating member having an interior region cut out therefrom with slots on the inner edge of said stator and apertures through said stator adjacent said slots, a rotor having contacts mounted on opposite sides thereof disposed in said interior region, contacts mounted in pairs on said stator at certain apertures, one contact being on one side of said stator and another contact on the other side thereof, each contact having an outwardly extending connecting portion bent away from the stator plane, a body portion disposed on the said stator at an aperture thereof and a contacting portion extending inwardly toward said rotor, said contacting portion comprising two thicknesses of metal bent away from each other and approaching each other at their free edges to form contact jaws adapted to embrace a rotor contact, one of said jaws being bent in to the stator plane and fitting into the corresponding slot in the stator, an insulating block disposed above said one contact and having a slot in the outer and inner edges thereof into which the connecting portion of said one contact fits, one of said jaws being adapted to fit into the inner slot of said block, said one contact having an aperture concentric with the stator aperture but larger, said other contact having an aperture similar to and registering with the stator aperture, and metallic means engaging said other contact and passing through the concentric apertures to maintain said contacts and insulator rigidly on said stator.

3. In an electric switch, a flat stator insulating member having an interior region cut out therefrom with slots on the inner edge of said stator and apertures through said stator adjacent said slots, a rotor comprising a flat insulating disc disposed in said inner region, flat contacts mounted on opposite sides of said rotor, contacts mounted in pairs on said stator at certain apertures, one contact being on one side of said stator and another contact on the other side thereof, each contact having a body portion disposed at said stator at an aperture thereof and having a connecting portion extending outwardly from said body portion bent away from said stator plane and having a contacting portion extending from said body portion inwardly toward the rotor contacts, said contacting portion comprising two thicknesses of metal bent to form jaw edges, and one of said jaws of each contact being bent into the stator plane and fitting into the corresponding slot in the stator, an insulating block disposed above one of said contact pairs, said block having slots in the opposed edges overlying the inner and outer stator edges, the connecting portion of said one contact fitting into the outer slot of said block and one of the jaws of the contacting portion of said contact fitting into the inner slot of said block, said contact jaws being adapted to embrace a rotor contact, said one contact having an aperture in the body portion larger than but concentric with the stator aperture, the other contact of said pair having an aperture similar to and registering with the said aperture, and metallic means engaging said other contact and passing through the concentric apertures to maintain said contacts and insulator rigidly on said stator.

KENNETH C. ALLISON.